Patented Sept. 12, 1950

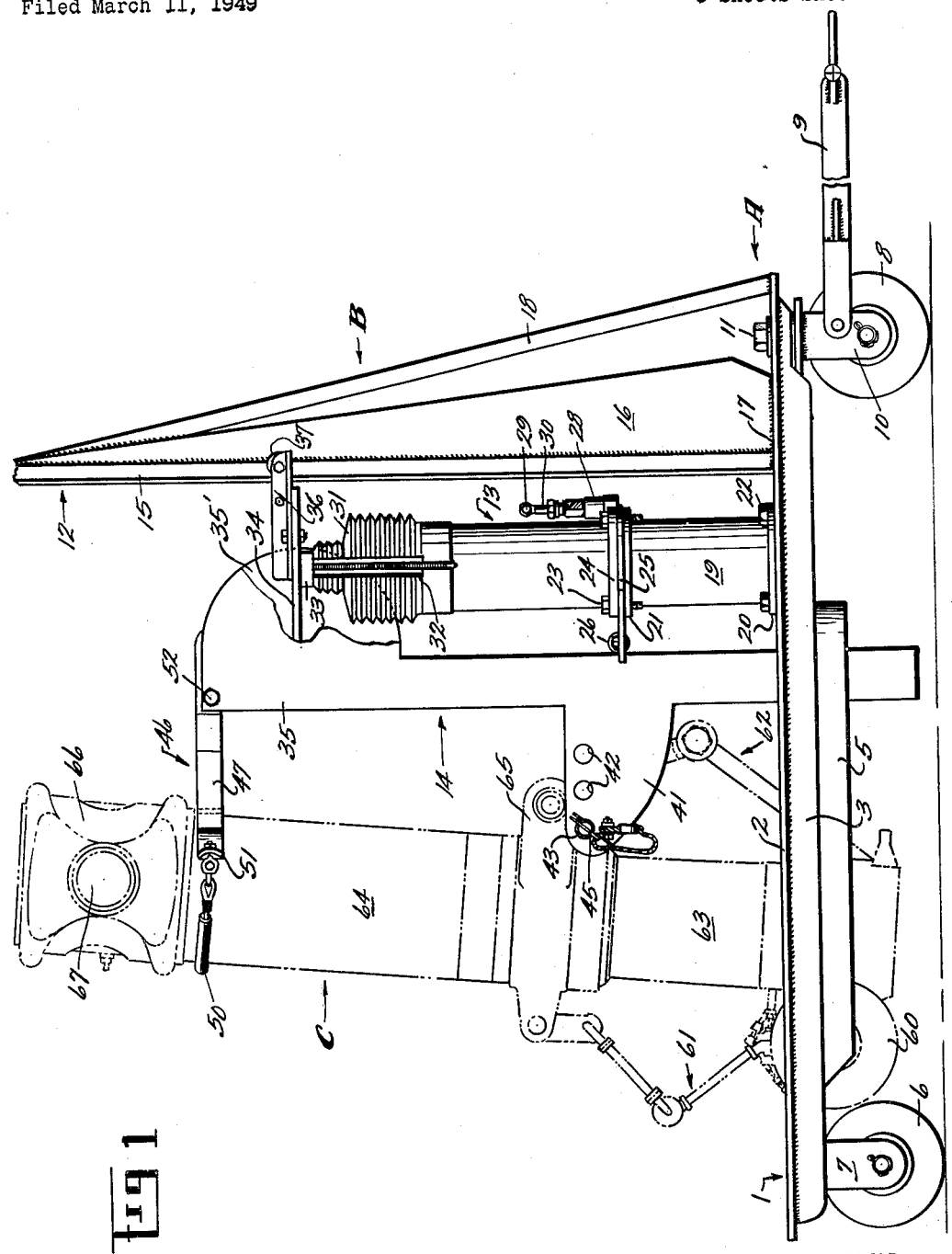

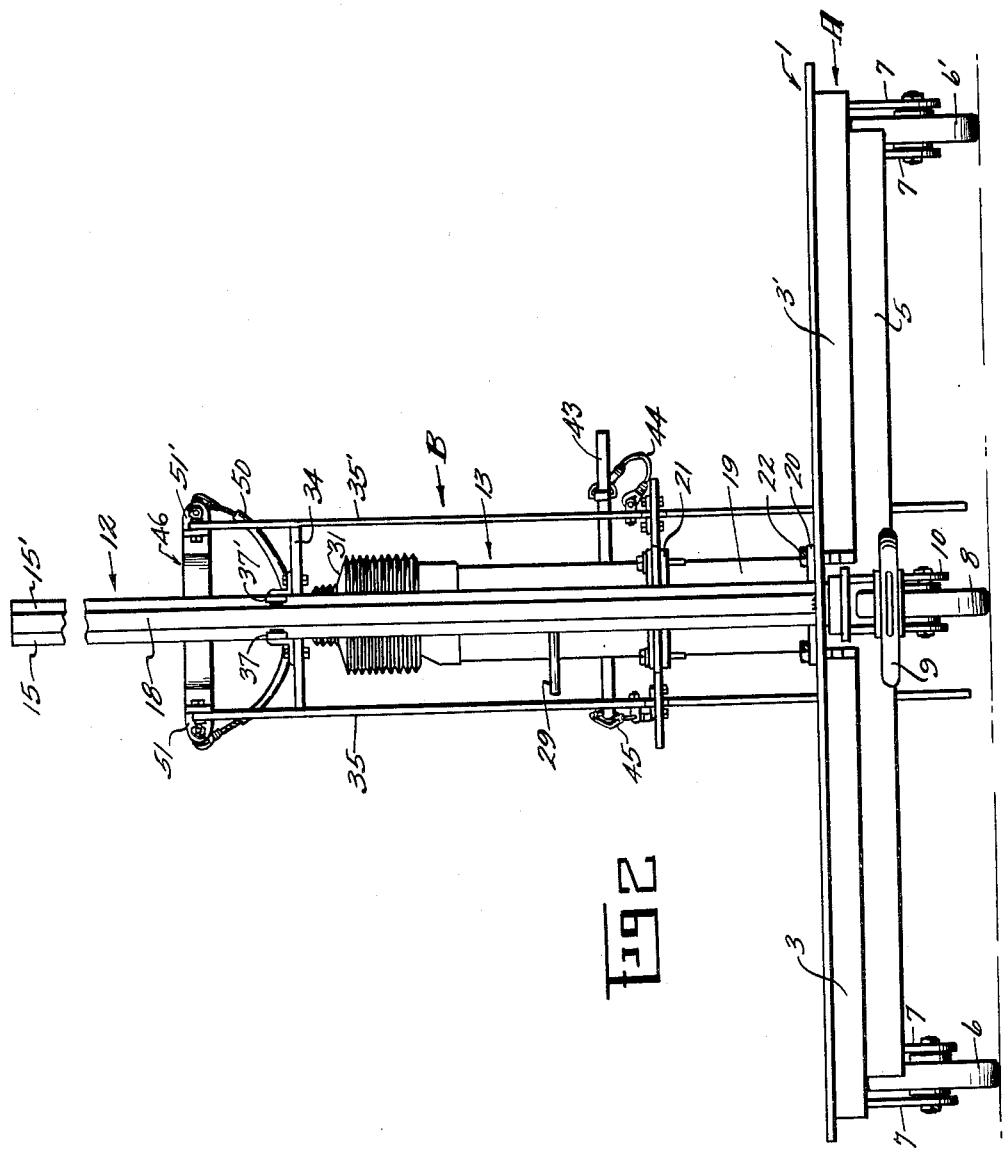

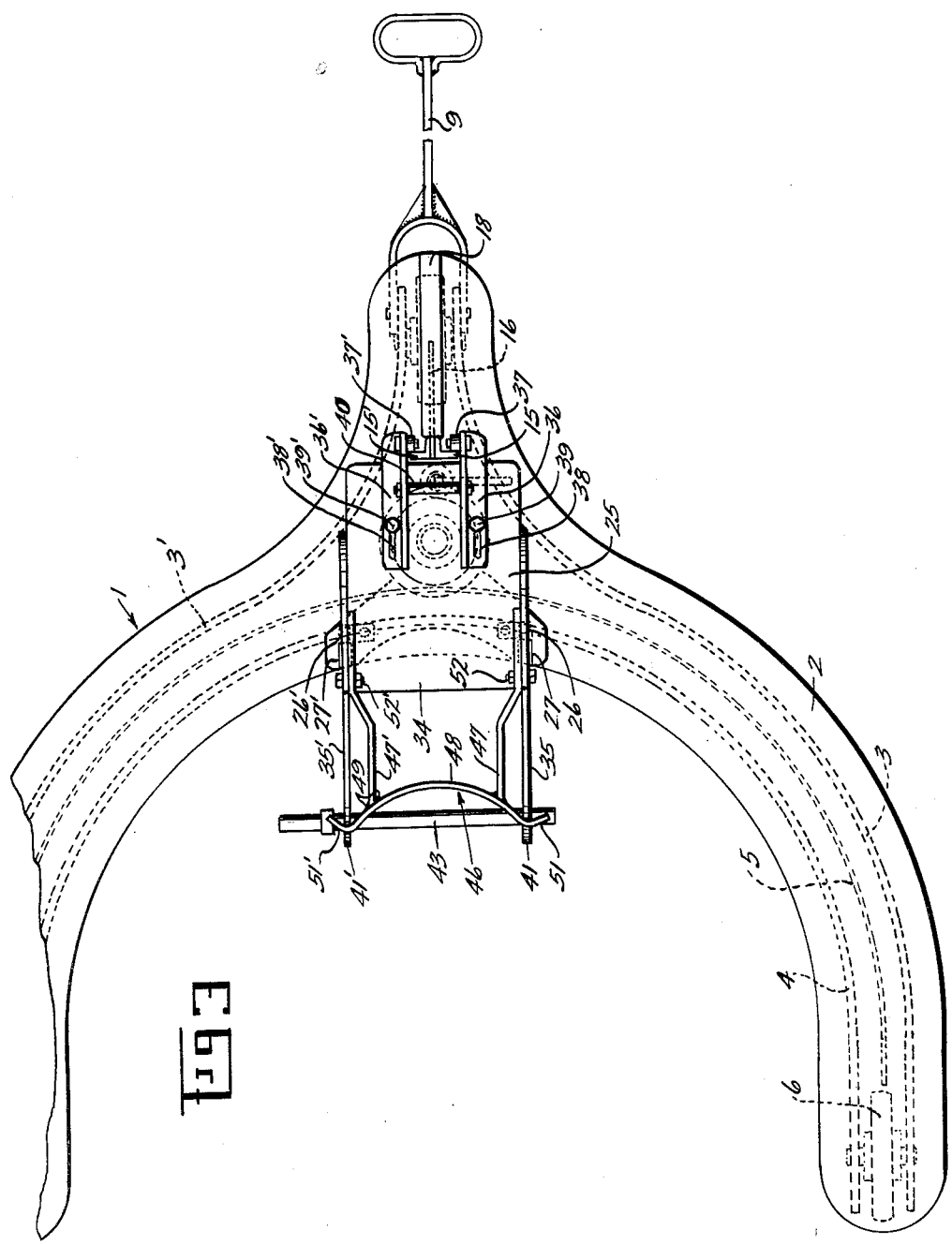

2,521,695

UNITED STATES PATENT OFFICE 2,521,695

AIRCRAFT LANDING GEAR STRUT DOLLY

Homer G. Davis, Oklahoma City, Okla.

Application March 11, 1949, Serial No. 80,984

8 Claims. (Cl. 214—65.4)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to an aircraft landing gear strut dolly useful in handling heavy struts during assembly and overhaul operations.

The primary object of the invention is to provide a means for handling heavy and cumbersome landing gear strut members and assemblies to enable a single mechanic to remove a strut member from an aircraft, transport it to the repair shop and then reinstall the strut member on the aircraft after it has been overhauled or repaired. In a similar manner heavy strut members may be handled during manufacturing of the strut members and assembly of complete aircraft.

A further object of the invention is to provide a dolly having mounted thereon an elevator including a carrier means for supporting an aircraft landing gear strut or other strut member, whereby the dolly may be moved into position near an upright strut member, the strut member may be secured to the carrier means, the dolly may be moved over the ground or floor to a desired location, the carrier means may be raised or lowered to the desired level, and the strut member may be detached from the carrier means after being made secure to an associated apparatus or machine.

Another object of the invention is to provide an aircraft landing gear strut dolly including an elevator adapted for actuation by means of a simple manually operable lifting jack.

Another object of the invention is to generally improve the construction and reliability of portable elevators and to extend the field of usefulness thereof.

Another object of the invention is to provide an aircraft landing gear strut dolly of welded construction and having a welded frame made entirely of readily available steel sheet and bar stock.

The above and other objects of the invention will become apparent upon reading the following detailed description in conjunction with the accompanying drawings, in which:

Fig. 1 is a side elevation view of the dolly and showing a typical strut member in broken lines in position for being transported by the dolly.

Fig. 2 is a front elevation view of the present dolly.

Fig. 3 is a top plan view of the present dolly.

Chassis assembly

The present dolly or portable elevator for handling heavy column or strut members comprises a truck or chassis A and an elevator B mounted on the chassis. The chassis includes a bed or frame 1 which is Y-shaped or wishbone-shaped in plan (see Fig. 3). The frame is made of a top plate 2 stiffened by means of drop flanges 3 and 3' and 4 which are welded to the underside of the top plate (see Fig. 3) near the edges thereof. Between these flanges there is provided an additional stiffening flange 5 of deeper section than the flanges 3, 3' and 4. The flange 5 which is welded to the underside of the top plate 2 extends in generally parallel relation with respect to the inside reinforcing flange 4. At the rear end of the chassis A there are mounted two ground engaging wheels 6 and 6' rotatably mounted on vertical side plates 7 welded to the flanges 3, 3' and 4. At the forward end of the chassis there is provided a ground engaging swivel wheel 8, adapted to be turned about a vertical axis by means of a long handle assembly 9. Thus by proper manipulation of the handle the dolly can be moved to proper position in proximity to the strut member C and for transporting the member C to a desired location after it is secured to the load bearing portions of the elevator B. The wheel 8 is rotatably mounted on a fork 10 mounted to rotate about a vertical axis by means of a bolt or pintle 11, thus providing a steerable front wheel on the chassis of the dolly.

Elevator assembly

The elevator assembly B is carried at the forward end of the chassis A, thus permitting the strut member C to be positioned over the opening formed by the two branches of the Y-shaped chassis frame 1. Thus the load will come within the confines of the dolly and there will be no tendency for the loaded dolly to upset or overturn, at least as long as it is standing on fairly level floors. The elevator assembly consists of a vertical roller guide 12, a jack 13 and a strut carrier 14. The roller guide 12 comprises a pair of identical angle irons 15 and 15' welded to a central plate 16 having a generally triangular outline (see Fig. 1). The lower ends of angle irons or guide tracks 15 and 15' and the plate 16 are welded to the upper side of the top plate 2, as indicated at 17. In order to further brace the vertical roller guide 12 a length of steel tubing 18 is welded to the top plate 2 and also to the central gusset plate 16.

The elevator jack 13 is mounted on the upper end of a tubular support or stand 19 having end flanges 20 and 21 welded thereto. The lower flange 20 is bolted as at 22 to the top plate 2 of the chassis, while the upper flange 21 is bolted as at 23 to the lower base flange 24 of the hydraulic jack 13. Secured between the confronting flanges 21 and 24 is a roller supporting plate 25 having a pair of antifriction rollers 26 and 26' mounted thereon in spaced relation. Opposite the rollers 26 and 26' the plate 25 is notched out at 27 and 27' to receive two vertical plate members included in the strut carrier 14, thus permitting these plate members to roll on the rollers 26 and 26' during vertical movement of the strut carrier 14. Securely mounted at the lower end of the jack 13 is a small hand-operated hydraulic pump 28 having a pivoted handle 29 for operating the pump piston 30. The hydraulic fluid is mostly contained in a reservoir inside the jack 13 but when the handle 29 is rocked up and down the fluid passes into the main cylinder of the jack to lift the main piston upward. The hydraulic jack itself is old and well-known in the art of elevators and elevating devices. The upper end of the main jack piston is completely enclosed by an accordion-like jacket 31 made of heavy fabric such as canvas or rubberized textile material. The jacket is closed along one side by a zipper-type closure means 32. The upper end of the main jack piston is of relatively small diameter and may fit within a cup or sleeve 33 welded to the underside of the transverse plate 34 extending between and welded to the two main plates 35 and 35' of the strut carrier 14. The transverse plate 34 provides a thrust receiving member in continuous contact with the movable upper end of the jack 13.

The vertically elongated strut carrier 14, which is arranged to rise and fall in response to action of the hydraulic jack 13, includes two spaced apart main plates 35 and 35' having enlarged upper ends extending along each of two opposite sides of the jack. Between the enlarged upper ends of the plates is secured a connecting plate 34, as mentioned above. This plate 34 extends beyond the jack 13 toward the angle iron tracks 15 and 15' and has adjustably secured thereto a pair of roller carrier angle irons 36 and 36'. The vertical portions of the roller carriers 36 and 36' have a pair of spaced rollers 37 and 37' mounted thereon for continuous rolling contact with the tracks 15 and 15' (see Fig. 3). The horizontal portions of the roller carriers 36 and 36' are slotted at 38 and 38' to receive the securing bolts 39 and 39' and thus provide adjustable connections for the roller carriers 36 and 36'. The carriers 36 and 36 are connected together by means of a post 40 bolted to the vertical portions of the carriers 36 and 36'.

The forward vertical edges of the main plates 35 and 35' provide straight tracks or guides for rolling contact with the spaced rollers 26 and 26'. The rear vertical edges of the main plates include identical projections 41 and 41' having spaced apertures 42 provided therein in horizontal rows to receive a load carrying cross pin 43 in any one of three selected positions (see Fig. 1). The cross pin or cross bar 43 is permanently attached to the plate 35' by means of a short cable 44 and at the opposite end of the bar there is a transverse hole adapted to receive a wire securing device 45 permanently secured to the plate 35 below the apertures 42. The cross pin 43 is adapted to extend below an enlarged portion of the landing gear strut C as will be explained in more detail below.

At the upper end of the strut carrier 14 there is provided a shackle bracket 46. As best shown in Fig. 3 this bracket comprises three pieces of strap iron 47, 47' and 48. The identical side pieces 47 and 47' are welded at 49 to the arcuate piece 48, the latter acting as a portion of a loop or shackle which is completed by providing a heavy cable or chain 50 anchored by eyebolts to the apertured free ends 51 and 51' of the arcuate piece 48. The arcuate piece 48 serves as a seat against which the upper portion of the strut member C is held while the cable 50 is installed as shown in Fig. 1 to securely shackle the strut member in place while its lower end is supported by the cross pin 43. The eyebolts at each end of the cable may be tightened to ensure a tight grip on the strut member. The forward ends of the side pieces 47 and 47' are bolted to the plates 35 and 35' respectively by means of bolts 52 and 52' secured by nuts on the adjacent ends thereof. Thus the shackle bracket 46 may be turned a limited amount about the bolts 52 and 52' so as to adapt it for securing reception of strut members of varying overall length.

Reference will now be made to Fig. 1 for a description of a typical strut member C as found on a heavy bombing or transport airplane. This object to be handled by the present dolly makes up part of a retractable landing gear, there being two struts of the kind indicated at C to carry the right and left hand wheels respectively. These wheels are mounted concentrically with respect to the hub and brake assembly 60 mounted at the lower end of the strut member C. An articulated hydraulic line 61 carries braking pressure from the aircraft to the assembly 60. At the other side of the strut is a scissors joint or "nutcracker" 62 for preventing relative rotation of the telescopic strut sections 63 and 64. The lower section 63 has a sliding fit in the upper section 64 and by action of hydraulic fluid therein a cushioning action is obtained when the strut is in service. At the lower end of the section 64 a projection 65 not only provides a bearing connection for the scissors joint 62 but also provides an abutment for supporting contact with the cross pin 43 on the strut carrier 14. At the upper end of the strut section 64 there is an enlarged head end 66 having a bearing 67 for mounting the retractable strut on the aircraft. Just below the head end 66 the strut section 64 is round and smooth, so that it will be received within the shackle bracket 46 with an extensive surface contact for retention therein by the shackle cable 50. The cable preferably comprises a short section of steel wire cable having a rubber tube thereon for protection against abrasion. While the present dolly or portable elevator is intended primarily for handling of aircraft landing gear struts, the apparatus is also adapted for use in handling heavy machine components of generally columnar form, such as heavy axles and boring mill columns.

*Summary of operation*

The manner of using the present landing gear strut dolly is more or less obvious but a summary of operation will now be set out to explain the preferred manner of use and some of the advantages of the dolly. Assuming that an aircraft is resting on blocks or supports with the landing gear fully extended, the dolly may be backed carefully into position near a landing gear strut C which is already stripped of its wheel or wheels.

The strut carrier 14 is then elevated by use of the pump 28 until the projections 41 and 41' of the plates 35 and 35' are just below the strut projection 65. Then with the cross-pin 43 removed from the holes 42 in projections 41 and 41', the dolly may be backed up slightly until the outer ends of projections 41 and 41' are adjacent to the landing gear strut. The cross-pin 43 is then slid into one pair of opposite apertures 42 so that the pin is under the strut projection 65 and contiguous to the strut body. It may now be necessary to pump up the strut carrier 14 slightly so that the cross-pin 43 is in firm contact with the projection 65. Now the upper end of the strut is made secure to the carrier by fastening the cable 50 around the section 64, with the section 64 received in the shackle bracket 46. This may require a small amount of pivotal movement of the strut about its main bearing 67, along with a further backing up of the dolly so that the supporting pin 43 will remain in the desired position under projection 65 and contiguous to the strut body. With the strut now fully secured to the carrier 14, the main bearing 67 may be disconnected from the aircraft frame and the strut C will be ready for removal to the shop for overhaul or repair. However before traveling any appreciable distance, the strut carrier 14 is lowered to the position of Fig. 1 with the lower end of the strut C extending down inside the open rear end of the chassis A. This is accomplished by manipulation of a pressure relief valve on the jack 13 which may be opened to allow the hydraulic fluid in the main cylinder to escape slowly into the fluid reservoir. After the loaded dolly has been hauled to the shop, the strut C may either be taken off the carrier 14 or repairs may be undertaken with the strut attached to the carrier. In reinstalling the strut on the aircraft the procedure as just described is merely reversed.

As noted above the rollers 37 and 37' rolling on tracks 15 and 15' are mounted on adjustable members 36 and 36', so that the rollers may be positioned in correct relation to the guide tracks and jack thus preventing any side thrust on the jack piston. Also any wear on the rollers or tracks may be compensated by further adjustment of the roller supports 36 and 36'. While the present portable elevator utilizes a hydraulic jack in its preferred form, it should be understood that other types of mechanical jacks may be substituted for the hydraulic jack 13. As noted previously the roller supporting plate 25 under the lower end of jack 13 is notched at 27 and 27' opposite to the rollers 26 and 26'. This expedient will prevent displacement of the lower ends of the carrier plates 35 and 35' with respect to each other. However if desired these lower end portions may be joined by tie bars for greater rigidity in the carrier structure 14.

As may be observed from the foregoing description the entire structure of the present portable elevator is made of readily available plate and bar stock with the exception of the wheels 6, 6' and 8, the jack 13 and the various bolts and rollers. The plate material may be flame-cut to proper shape and the entire structure may be welded together in the manner described above.

The embodiments of the invention herein shown and described are to be regarded as illustrative only and it is to be understood that the invention is susceptible to variations, modifications and changes within the scope of the appended claims.

I claim:

1. An aircraft landing gear strut dolly comprising, a wheel-equipped chassis adapted for rolling engagement with the ground, said chassis being Y-shaped in plan to provide an open central portion extending toward the rear and being equipped with a steerable wheel at the forward end, a vertically operable jack mounted on said chassis, a vertical guide track mounted on said chassis adjacent to said jack and forwardly thereof, a vertically elongated strut carrier rearwardly of said jack having thrust receiving means near the upper end thereof in continuous contact with the vertically movable upper end portion of said jack, track engaging means secured to said strut carrier for continuous contact with said vertical guide track, roller means mounted on said jack for continuous rolling contact with a straight vertical edge portion of said strut carrier, and a plurality of means for securing the landing gear strut to said strut carrier with said strut positioned over said open central portion of said chassis.

2. An aircraft landing gear strut dolly comprising, a wheel-equipped chassis adapted for rolling engagement with the ground, a vertically operable jack mounted on said chassis, a vertical guide track mounted on said chassis adjacent to said jack, a vertically elongated strut carrier having a transverse thrust receiving member near the upper end thereof in continuous contact with the vertically movable upper end portion of said jack, roller means carried by said transverse member for continuous rolling contact with said vertical guide track, a second roller means mounted adjacent to said jack for continuous rolling contact with a straight vertical edge portion of said strut carrier, a horizontal cross-pin carried on said strut carrier and adapted to support the weight of the landing gear strut by contact with the underside of a projection rigidly fixed thereon, and shackle means at the upper end of said strut carrier for embracing said landing gear strut near its upper end to retain the same tightly against the upper end of said strut carrier.

3. An aircraft landing gear strut dolly comprising, a wheel-equipped chassis adapted for rolling engagement with the ground, a vertically operable jack mounted on said chassis, a vertical guide track mounted on said chassis adjacent to said jack, a vertically elongated strut carrier including a pair of spaced parallel plates connected near the upper ends thereof by a transverse thrust receiving member in continuous contact with the vertically movable upper end portion of said jack, roller means carried by said transverse member for continuous rolling contact with said vertical guide track, a second roller means mounted adjacent to said jack for continuous rolling contact with straight vertical edge portions of said parallel plates, a lateral projection on each of said parallel plates, a cross-pin connecting said lateral projections and adapted to support the weight of the landing gear strut by contact with the underside of a projection rigidly fixed thereon, and shackle means secured at the upper ends of said parallel plates for embracing said landing gear strut near its upper end to retain the same tightly against the upper end of said strut carrier.

4. An aircraft landing gear strut dolly comprising, a wheel-equipped chassis adapted for rolling engagement with the ground, a vertically operable jack mounted on said chassis, a vertically elongated strut carrier including a pair of spaced parallel plates connected near the upper ends thereof by a transverse thrust receiving member in continuous contact with the vertically movable upper end portion of said jack, roller means mounted adjacent to said jack at the lower end thereof for continuous rolling contact with straight edge portions of said parallel plates, a lateral projection on each of said parallel plates extending therefrom on the sides opposite to said straight edge portions, a cross-pin connecting said lateral projections and adapted to support the weight of the landing gear strut by contact with the underside of a projection rigidly fixed thereon, and shackle means secured at the upper ends of said parallel plates for embracing said landing gear strut near its upper end to retain the same tightly against the upper end of said strut carrier.

5. A portable elevator comprising, a wheel-equipped chassis adapted for rolling engagement with the ground, a vertically operable jack mounted on said chassis, a vertically elongated carrier including a pair of spaced parallel plates connected near the upper ends thereof by a transverse thrust receiving member in continuous contact with the vertically movable upper end portion of said jack, roller means mounted on said jack for continuous rolling contact with straight longitudinal edge portions of said parallel plates, and means extending from said plates on the sides opposite to said straight edges portions for supporting an article to be carried on said portable elevator.

6. A portable elevator comprising, a wheel-equipped chassis adapted for rolling engagement with the ground, a vertically operable jack mounted on said chassis, a vertical guide means mounted on said chassis adjacent to said jack, a vertically elongated carrier including a pair of spaced parallel plates connected near the upper ends thereof by a transverse thrust receiving member in continuous contact with the vertically movable upper end portion of said jack, roller means mounted on said carrier for continuous rolling contact with said vertical guide means, a second roller means mounted adjacent to said jack for continuous rolling contact with straight edge portions of said parallel plates, and means extending from said plates on the sides opposite to said straight edge portions for supporting an article to be carried on said portable elevator.

7. In a portable elevator, an article carrier comprising, a pair of spaced parallel plates adapted to be mounted in vertical relation on the elevator and be guided for vertical movement thereon, a transverse thrust receiving member rigidly connected between said plates near the upper ends thereof, one edge portion of each plate being straight to form vertical guide means for said carrier, an opposite edge of each plate being provided with a lateral projection, a cross-pin connecting said lateral projections and adapted to support the weight of an article by contact with the underside of a portion thereof, and shackle means secured at the upper ends of said parallel plates for embracing the article near its upper end to retain the same tightly against the upper end of said article carrier.

8. An aircraft landing gear strut dolly comprising, a wheel-equipped chassis adapted for rolling engagement with the ground, a vertically operable jack mounted on said chassis, a vertical guide track mounted on said chassis adjacent to said jack and at one side of said jack, a vertically elongated strut carrier adjacent to said jack and at the side thereof remote from said guide track, a transverse thrust receiving member rigidly connected to said strut carrier near the upper end thereof and in continuous contact with the vertically movable upper end portion of said jack, roller means carried by said transverse member for continuous rolling contact with said vertical guide track on the side remote from said jack, a roller supporting member rigidly mounted on said jack and projecting toward said strut carrier, a second roller means mounted on said roller supporting member for continuous rolling contact with a straight vertical edge portion of said strut carrier facing said jack, and shackle means for securing the landing gear strut to said strut carrier.

HOMER G. DAVIS.

REFERENCES CITED

The following references are of record in the file of this patent:

UNITED STATES PATENTS

| Number | Name | Date |
|---|---|---|
| 1,523,486 | Manley | Jan. 20, 1925 |
| 2,156,204 | Stolze | Apr. 25, 1939 |
| 2,422,298 | Freis | June 17, 1947 |
| 2,437,982 | Tietsema | Mar. 16, 1948 |
| 2,467,500 | Salter | Apr. 19, 1949 |
| 2,490,233 | Schildmeier | Dec. 6, 1949 |

FOREIGN PATENTS

| Number | Country | Date |
|---|---|---|
| 593,960 | Great Britain | Oct. 30, 1947 |